United States Patent
Chemali et al.

(10) Patent No.: US 6,957,708 B2
(45) Date of Patent: Oct. 25, 2005

(54) ELECTRICAL IMAGING IN CONDUCTIVE AND NON-CONDUCTIVE MUD

(75) Inventors: Roland E. Chemali, Kingwood, TX (US); Martin Folberth, Hannover (DE); Tsili Wang, Katy, TX (US); Rene Ritter, Celle (DE)

(73) Assignee: Baker Hughes Incorporated, Houston, TX (US)

( * ) Notice: Subject to any disclaimer, the term of this patent is extended or adjusted under 35 U.S.C. 154(b) by 267 days.

(21) Appl. No.: 10/616,857

(22) Filed: Jul. 8, 2003

(65) Prior Publication Data

US 2005/0006090 A1 Jan. 13, 2005

(51) Int. Cl.[7] .............................................. E21B 47/12
(52) U.S. Cl. .................... 175/50; 175/325.4; 175/325.5
(58) Field of Search ............................. 175/41, 50, 230, 175/325.1–321.5; 166/65.1, 241.6, 248, 254.2; 324/338, 369

(56) References Cited

U.S. PATENT DOCUMENTS

| | | | |
|---|---|---|---|
| 3,268,274 A | 8/1966 | Ortloff et al. ................... 308/4 |
| 3,973,181 A | 8/1976 | Calvert ........................... 324/5 |
| 4,052,662 A | 10/1977 | Rau ................................ 324/6 |
| 4,468,623 A | 8/1984 | Gianzero et al. ............ 324/367 |
| 5,200,705 A | 4/1993 | Clark et al. .................. 324/338 |
| 5,339,036 A | 8/1994 | Clark et al. .................. 324/338 |
| 6,173,793 B1 | 1/2001 | Thompson et al. ............ 175/45 |
| 6,268,726 B1 * | 7/2001 | Prammer et al. ............ 324/303 |
| 6,739,409 B2 * | 5/2004 | Kruspe et al. ................. 175/50 |
| 2002/0134587 A1 | 9/2002 | Rester et al. .................. 175/48 |

* cited by examiner

Primary Examiner—Zakiya Walker
(74) Attorney, Agent, or Firm—Magan, Mossman & Sriram, P.C.

(57) ABSTRACT

The invention is a method and apparatus for determining an electrical property a formation surrounding a borehole with a measuring-while-drilling device. The apparatus an antenna configuration disposed along the outer face of an extendable stabilizer joined to a rotatable drill collar. Typically, two receivers and two transmitters are spaced along the longitudinal axis of the drill collar, with the two receivers spaced symmetrically in between the two transmitters. Alternatively, receivers and transmitters can be spaced along the circumference, possibly over multiple stabilizers. Multiple assemblies can be used. Data can be obtained with the transmitter-receiver assembly held in a stationary position or rotating circumferentially. Apparatus can be operated in a "broadside" configuration, an "endfire" configuration, or a configuration in which transmitter coils and receiver coils are oriented orthogonally to each other.

37 Claims, 8 Drawing Sheets

ELECTRICAL IMAGING IN CONDUCTIVE AND NON-CONDUCTIVE MUD

BACKGROUND OF THE INVENTION

1. Field of the Invention

The present invention relates to well logging. In particular, the present invention is an apparatus and method for imaging of subsurface formations using electrical methods.

2. Description of the Related Art

U.S. Pat. No. 4,468,623, issued to Gianzero, discloses tool mounted pads, each with a plurality of small measure electrodes from which individually measurable survey currents are injected toward the wall of the borehole. The measure electrodes are arranged in an array in which the measure electrodes are so placed at intervals along at least a circumferential direction (about the borehole axis) as to inject survey currents into the borehole wall segments which overlap with each other to a predetermined extent as the tool is moved along the borehole. The measure electrodes are made small to enable a detailed electrical investigation over a circumferentially contiguous segment of the borehole so as to obtain indications of the stratigraphy of the formation near the borehole wall as well as fractures and their orientations. In one technique, a spatially closed loop array of measure electrodes is provided around a central electrode with the array used to detect the spatial pattern of electrical energy injected by the central electrode. In another embodiment, a linear array of measure electrodes is provided to inject a flow of current into the formation over a circumferentially effectively contiguous segment of the borehole. Discrete portions of the flow of current are separably measurable so as to obtain a plurality of survey signals representative of the current density from the array and from which a detailed electrical picture of a circumferentially continuous segment of the borehole wall can be derived as the tool is moved along the borehole. In another form of an array of measure electrodes, they are arranged in a closed loop, such as a circle, to enable direct measurements of orientations of resistivity of anomalies.

The device of Gianzero '623, is primarily designed for highly conductive mud. In oil based muds, (OBM) the currents flowing from the electrodes depend upon good contact between the electrode and the borehole wall. If the borehole wall is irregular, the contact and the current from the electrodes is irregular, resulting in inaccurate imaging of the borehole. Finally, being a wireline tool, a plurality of contact pads disposed around the logging tool must be used to get a 360° scan of the borehole.

OBM increase drilling efficiency due to better lubrication of drill bits. In addition, increasing number of present day exploration prospects lie beneath salt layers that are water soluble, necessitating the use of OBM for drilling U.S. Pat. No. 3,973,181 to Calvert teaches a method and apparatus for investigating earth formations traversed by the borehole containing an electrically nonconductive fluid in which a system of pad-mounted electrodes are arranged laterally around a well tool. A high frequency oscillator is coupled to the electrodes through a selectively variable capacitor. As the apparatus is passed through the borehole, the high frequency current produced by the oscillator capacitively couples the electrodes to the formation and provides a measure of the electrical conductivity or resistivity of the earth formation.

U.S. Pat. No. 4,052,662 to Rau et al discloses a wireline resistivity measuring device that preferably operates in the frequency range of 300 MHz to 300 GHz. In order to make accurate phase measurements at such high frequencies, a heterodyning principle is used with the received signals being mixed with an oscillator that has an output frequency that differs from the frequency of the transmitted signal: the difference may be 100 kHz or so. The addition of a mixer and the secondary oscillator, adds greatly to the complexity of the hardware. Such heterodyning has commonly been used in high frequency resistivity measuring devices.

U.S. Pat. No. 5,339,036 to Clark et al teaches a MWD resistivity device in which button electrodes are mounted on a stabilizer blade. The device of Clark is primarily designed for use with WBM and requires that the button electrodes be in close contact with the formation. In a MWD tool, this results in rapid wearing away of the electrodes, necessitating frequent replacement.

U.S. patent application Ser. No. 09/836,980 of Evans et al. having the same assignee as the present application and the contents of which are fully incorporated herein by reference, teaches an apparatus and method based on the use of high frequency measurements for injecting measure currents into the formation. One embodiment of the device and method taught in the Evans '980 application uses a carrier frequency that is sufficiently high to capacitively couple the measure electrodes to the formation through the nonconducting mud. By modulating the carrier current at a frequency used in prior art resistivity imaging devices, it is possible to get measurements of formation resistivity with relatively minor changes in the hardware of prior art resistivity devices, the main modification being a modulator for producing the measure currents demodulator for demodulation of the measure currents.

U.S. patent application Ser. No. 10/090,374, of Evans, having the same assignee as the present application and the contents of which are fully incorporated herein by reference, discloses a method for obtaining a resistivity image of an earth formation penetrated by the borehole. The apparatus includes at least one measure electrode that injects a measure current into the formation. Due to the high frequency of the current, an electrical circuit is complete when the borehole is filled with a non-conductive fluid through a capacitive gap between the electrode and the formation. A guard potential is provided to maintain focusing of the current. The modulation of the measure current and the demodulation of the output of the current measuring circuit helps reduce the cross-talk between them. Amplitude modulation reverse amplitude modulation, frequency modulation or phase modulation may be used.

U.S. Pat. No. 6,173,793 B1, issued to Thompson et al., is an apparatus and method for obtaining information about a formation using sensors on a substantially non-rotating pads attached to a rotating housing that is part of the drilling assembly. The pads make contact with the formation. The sensors may be density, NMR, resistivity, sonic, or electromagnetic. The NMR sensors may use a static magnetic field that can be either radial or longitudinal in direction. The resistivity sensors may involve direct measurement of leakage current or may rely on induction methods. In an alternate arrangement, the sensors rotate with the drill bit. A downhole microprocessor analyzes the data to improve signal-to-noise ratio and to reduce redundancy in the acquired data. Depth information may be telemetered from an uphole controller to facilitate the process.

A need exists for obtaining electrical measurements in a robust MWD logging device for use with OBM and WBM that obtains higher resolution and azimuthal recording capabilities. Such a device should preferably be simple. The present invention fulfills this need.

SUMMARY OF THE INVENTION

The present invention is a method and apparatus for determining an electrical property of a formation surrounding a borehole with a measuring-while-drilling device. The apparatus comprises a rotatable drill collar, and may include at least one extendable stabilizer joined to the drill collar, at least one transmitter for injecting at least one RF signal into the formation, and at least one receiver for measuring the phase and attenuation of the RF signal upon propagation through the formation. The at least one receiver and the transmitter define a plurality of transmitter-receiver spacings. A hardfacing enables a specified standoff of the stabilizer from the borehole wall. Rate of penetration of the drill collar can be determined using for instance, an axial accelerometer, or a second resistivity sensor placed at a different axial position.

In a preferred embodiment of the invention, the at least one transmitter further comprises two spaced-apart collimated transmitting antennae. Similarly, the at least one receiver further comprises two spaced-apart receiving antenna. Preferably, two receivers and two transmitters are spaced along the longitudinal axis of the drill collar, with the two receivers spaced symmetrically in between the two transmitters. The transmitters and receivers can be disposed along the stabilizer. The transmitters and receivers are typically disposed along the outer face of the stabilizer. Any additional stabilizers attached to the drill collar can carry an additional assembly of two transmitters and two receivers similarly disposed. Alternatively, the two transmitters and receivers can be disposed on a plurality of stabilizers circumferentially spaced around the drill collar. In another alternative embodiment, the transmitters and receivers can be disposed on a single stabilizer. Data can be obtained with the transmitter-receiver assembly held in a stationary position or rotating circumferentially. Transmitter and receivers are operated preferably within a frequency range of 50 MHz to 300 MHz, though a range of 10 MHz to 2 GHz would be expected to provide satisfactory results.

Transmitters and receives are generally situated within a cavity in the stabilizer, the cavity having an opening to the stabilizer face with an oriented rectangular slot separating individual transmitter and receiver assemblies from the outside. The orientation of the rectangular slots present several possibilities for operation of the assembly.

In a "broadside" configuration, slots are aligned so that the long edge extends in a direction transverse to the direction of propagation of the signal. In an "endfire" configuration, slots extend in a direction parallel to the direction of propagation. The direction of propagation may be parallel to the tool axis or may be transverse to the tool axis. The direction of propagation may be parallel to the tool axis or may be transverse to the tool axis. The deeper depth of investigation of the "endfire" configuration is less affected by tool stand-off. The broadside array may be preferred in relatively lossy (low resistivity) logging environments such as when using water-based muds. In a third configuration, transmitter slots and receiver slots are oriented orthogonal to each other. The orthogonality of the antennae remove direct coupling.

BRIEF DESCRIPTION OF THE DRAWINGS

The present invention may be best understood by reference to the following figures in which like numerals refer to like elements.

DESCRIPTION OF PREFERRED EMBODIMENT

Figure 1:
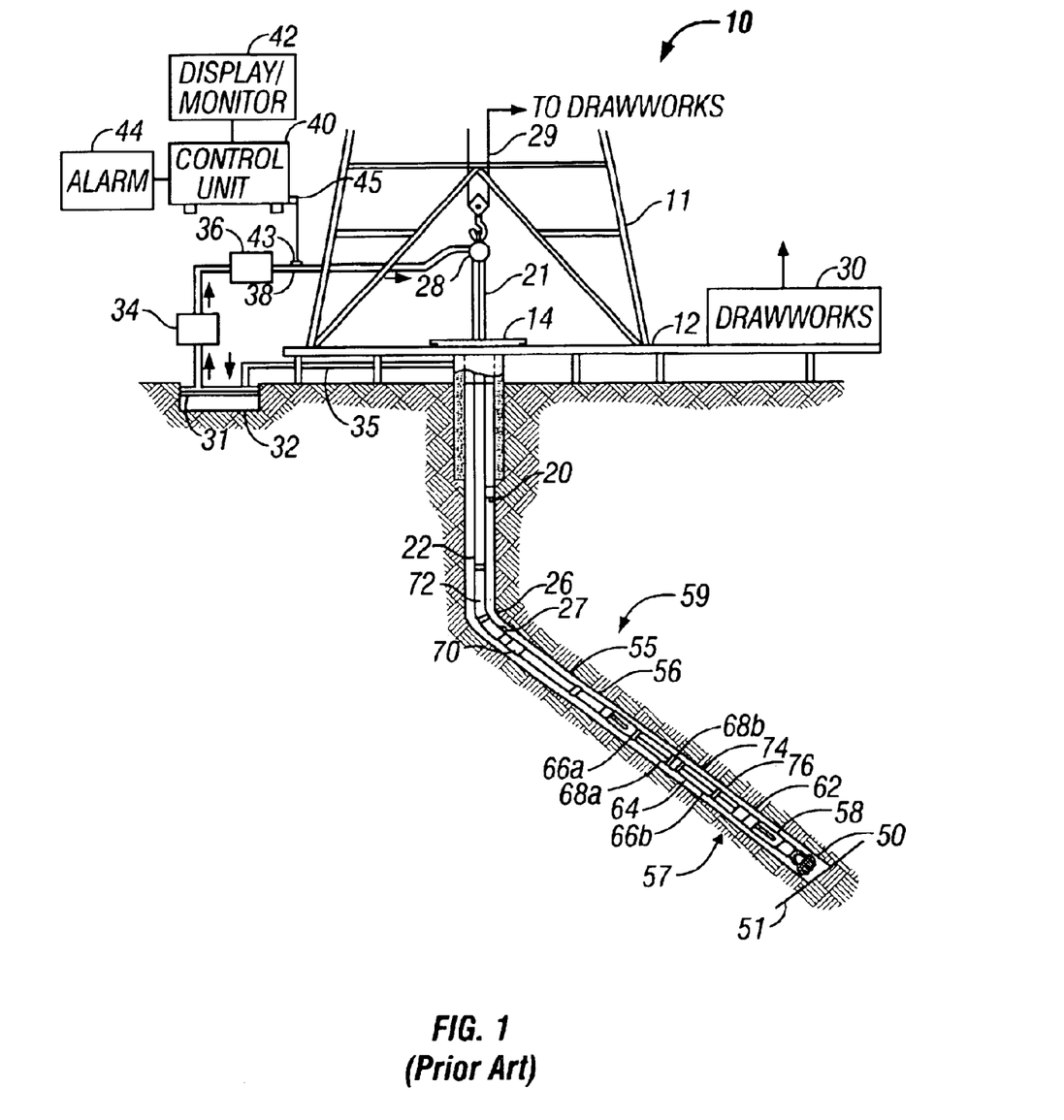
FIG. 1 (Prior Art) illustrates a measurement-while-drilling (MWD) logging device that is suitable for use with the present invention.

FIG. 1 shows a schematic diagram of a drilling system 10 having a downhole assembly containing an acoustic sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In a preferred embodiment of the system of present invention, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA also preferably contains sensors and devices in addition to the above-described sensors. Such devices include a device for measuring the formation resistivity near the drill bit, a gamma ray device for measuring the formation gamma ray intensity and devices for determining the inclination and azimuth of the drill string. The formation resistivity measuring device 64 is preferably coupled above the lower kick-off subassembly 62 that provides signals, from which resistivity of the formation near or in front of the drill bit 50 is determined. A dual propagation resistivity device ("DPR") having one or more pairs of transmitting antennae 66a and 66b spaced from one or more pairs of receiving antennae 68a and 68b is used. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and/or amplitude of the detected signals. The detected signals are processed by a downhole circuit that is preferably placed in a housing 70 above the mud motor 55 and transmitted to the surface control unit 40 using a suitable telemetry system 72. Determination of formation resistivity from amplitude and phase measurements is well known in prior art. U.S. Pat. No. 5,811,973 to Meyer having the same assignee as the present invention and the contents of which are fully incorporated herein by reference, further teaches the determination of resistivity of the connate formation fluid, the dielectric constant of the dry rock matrix, and the water filled porosity of the formation. Such determinations may also be made with the present invention using the methods taught by Meyer.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

The drill string contains a modular sensor assembly, a motor assembly and kick-off subs. In a preferred embodiment, the sensor assembly includes a resistivity device, gamma ray device, and inclinometer. A processor (not shown) is located downhole for processing the data. Due to the large amount of data that are obtained and processed downhole, a memory device having adequate capacity is necessary.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present invention preferably utilizes a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this invention. The drilling assembly also includes a directional sensor. Without limiting the scope of the invention, the directional sensor can be a magnetometer or of the inertial type.

In one embodiment of the invention, a drilling sensor module 59 is placed near the drill bit 50. The drilling sensor module contains sensors, circuitry and processing software and algorithms relating to the dynamic drilling parameters. Such parameters preferably include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

Figure 2:
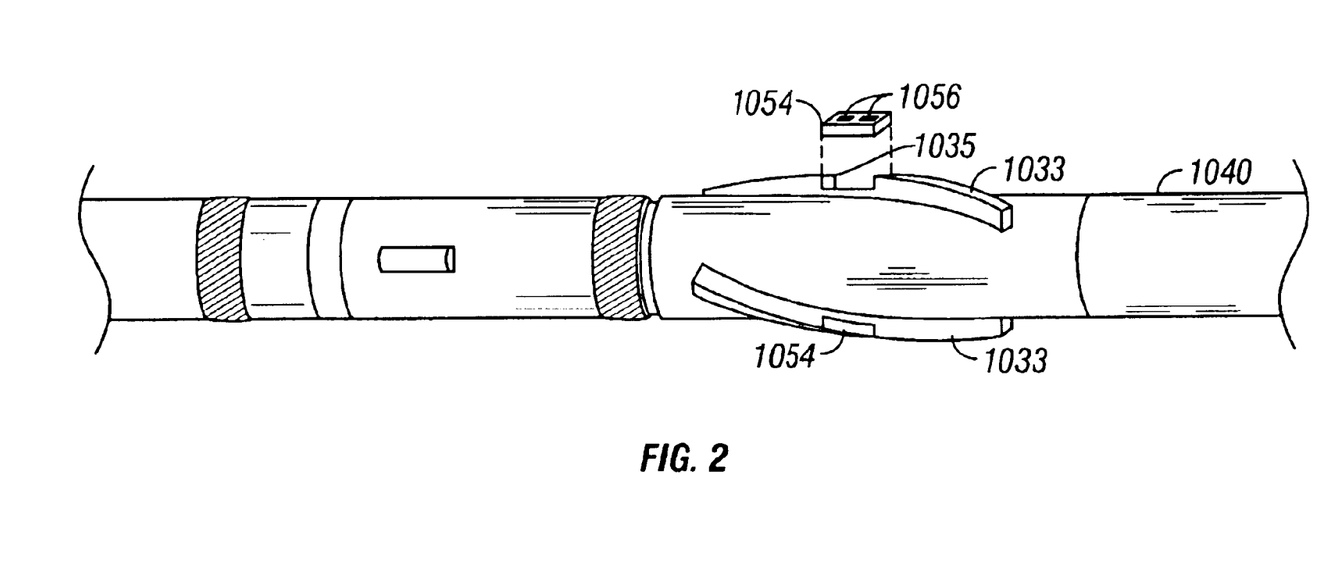
FIG. 2 shows a possible arrangement for an electromagnetic assembly on a rotating stabilizer.

FIG. 2 shows an embodiment of the invention for arranging the electromagnetic antenna assembly used to determine the resistivity of the formation. At least one of the stabilizers 1033 is provided with a recess 1035 into which an antenna assembly 1054 is set. Each electromagnetic transmitter/receiver module 1054 has a plurality of slots 1056 behind which the transmitter or receiver coils (not shown) are set. With the azimuthally disposed arrangement of the stabilizers 1033 and the transmitter/receiver modules 1054 on the stabilizers, this embodiment makes it possible to determine an azimuthal variation of resistivity.

Figure 3:
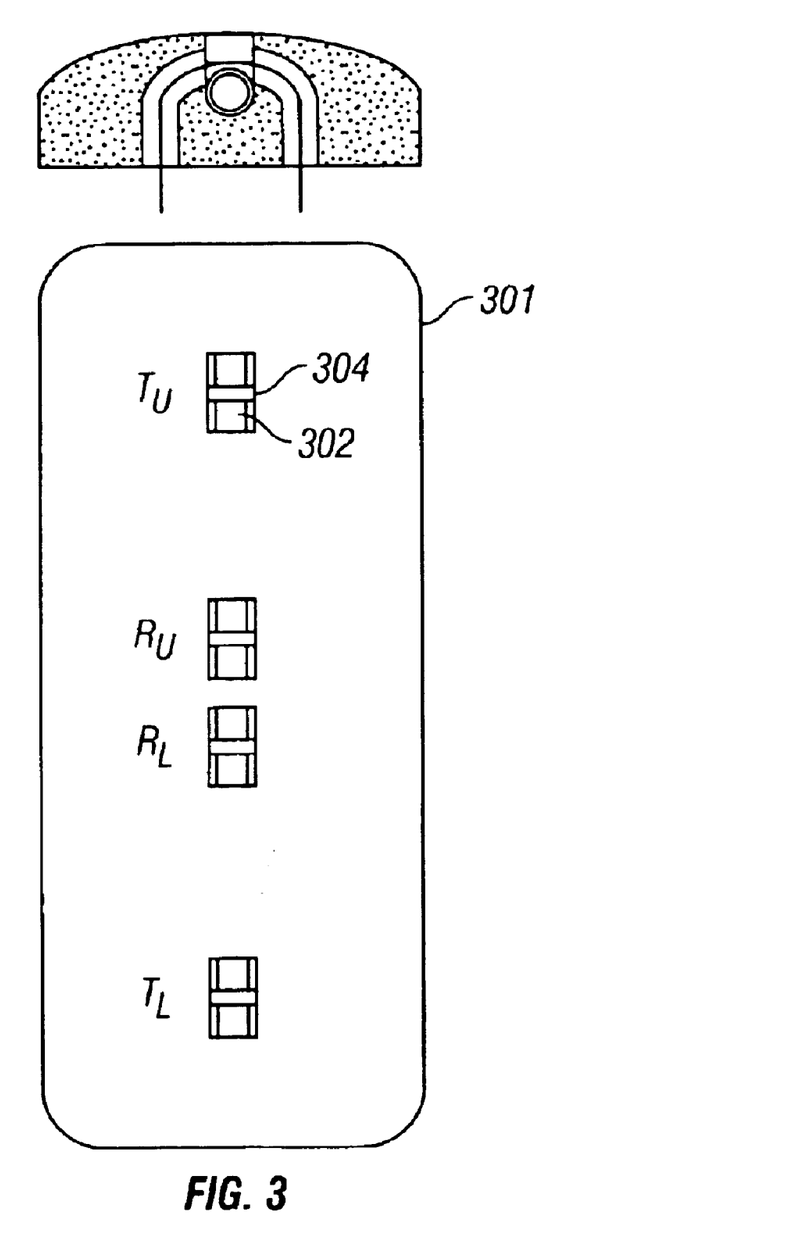
FIG. 3 shows a view of an antenna assembly of the preferred embodiment of the invention.

FIG. 3 shows a preferred embodiment of the present invention. A stabilizer 301 is attached to the drill collar and may be extendable outwards from the drill collar. Extendable stabilizers are disclosed, for example in U.S. Pat. No. 6,179,066 to Nasr et al, having the same assignee as the present invention and the contents of which are fully incorporated herein by reference. The stabilizer comprises a pair of axially-separated transmitting antennae, $T_U$ and $T_L$, separated by a distance along the tool axis. Each transmitting antenna is located within a recess on the outward-facing face of the stabilizer. Transmitter antennae comprise a wire coil 304 wrapped around a ferrite core 302. An RF signal can be induced at the antennae. Two receiving antennae, $R_U$ and $R_L$, are axially-separated between the two transmitting antennae. Transmitting and receiving antennae are substantially collinear, and the midpoint between the two transmitters is concurrent with the midpoint between the two receivers. Like the transmitting antennae, each receiving antenna is located within a recess on the outward-facing face of the stabilizer. Receivers similarly have a wire coil wrapped around a ferrite core. Each antenna unit is preferably embedded in epoxy and communicates with the borehole environment through a rectangular opening on the outward face of the stabilizer. In a preferred embodiment the orientation of these openings are aligned so that the long edge of the rectangular opening is oriented in a transverse direction to the tool axis. The dipole moments are similarly aligned along the transverse direction to the tool axis, so that slots that share an alignment direction contain corresponding antenna that share an alignment.

The reduced size and weight of the antennae enable a greater flexibility of use. It is desirable to have the distance between transmitters and receivers large compared to the thickness of the mud layer. The distance between receivers must be large enough to enable the distinguishing of a suitable range of phase shifts and small enough so that unnecessary ambiguities of measurement are avoided. Typically, a separation of 1 cm can exist between receiving antennae $R_U$ and $R_L$, a 9.5 cm separation between $T_U$ and $R_U$, and a 9.5 cm separation between $T_L$ and $R_L$.

In an alternate embodiment, the antenna assembly can be rotated so that the line connecting the transmitters and receivers lies in a transverse direction substantially along the circumference of the tool. In yet an alternate embodiment, multiple antenna assemblies can be used, each antenna assembly located on a separate stabilizer. In yet another alternate embodiment, antenna assemblies can be disposed over multiple stabilizers. (i.e. a transmitter disposed on a single (top) stabilizer 1033 of FIG. 2 and a receiver disposed on another (lower) stabilizer of FIG. 2, continuing circumferentially until the desired configuration is assembled.)

Figure 4:
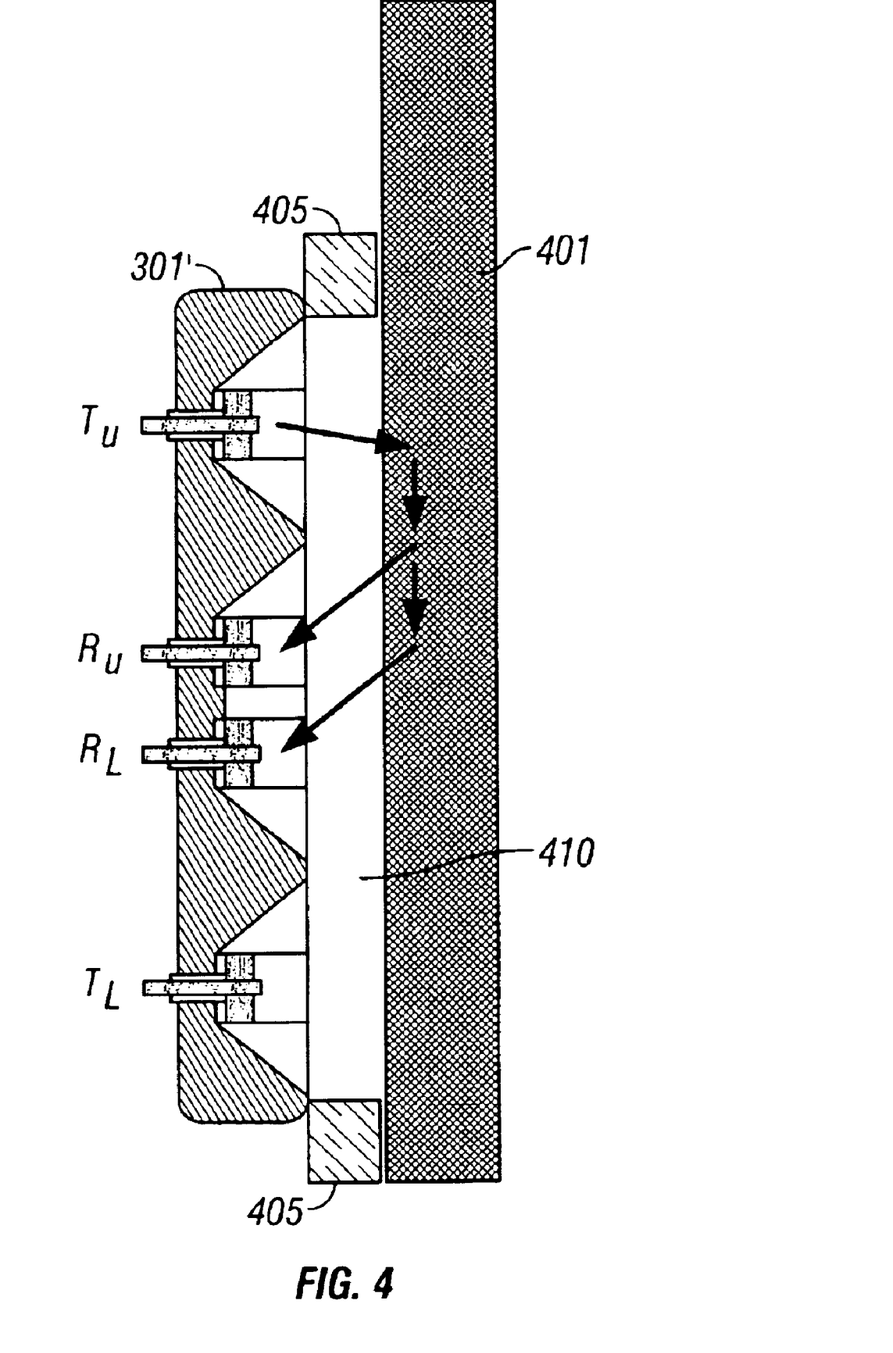
FIG. 4 shows a side view of the antenna assembly shown in FIG. 3.

FIG. 4 shows a side view of the antenna assembly of the preferred embodiment. The stabilizer 301' is placed against the borehole formation 401 with the antenna assembly facing towards the formation. A current excited in the transmitter loop $T_U$' induces an RF pulse in the surrounding region. Electromagnetic energy is transmitted from transmitter $T_U$' into the surrounding formation. Energy affected by the borehole wall is detected by receivers $R_U$' and $R_L$', which measure phase and attenuation characteristics of the propagated energy. The phase difference of the wave train between receivers is recorded as primarily sensitive to resistivity and somewhat sensitive to dielectric constant. The relative degree of sensitivity to each parameter depends on the level of resistivity. The same applies for attenuation.

One of the important considerations in operating the tool is the frequency range. As noted above, prior art techniques use heterodyning techniques for making measurements of the attenuation and phase of the signals. Also as noted above, this adds to the complexity of the hardware. In a preferred embodiment of the invention, the data are digitally sampled prior to processing. As would be known to those versed in the art, when sampling analog data for further digital processing, one of the important considerations is that the data be sampled at least at the Nyquist rate. Even for a 300 MHz signal, this requires a sampling rate of at least $6 \times 10^8$ samples per second. In order to avoid the complexity of an analog to digital converter capable of operating at such high sample rates, the data are deliberately undersampled. Such undersampling is disclosed, for example, in EP1315285 to Sorrels et al. The concept of undersampling and how it is used in the present invention is discussed next.

Figure 8A:
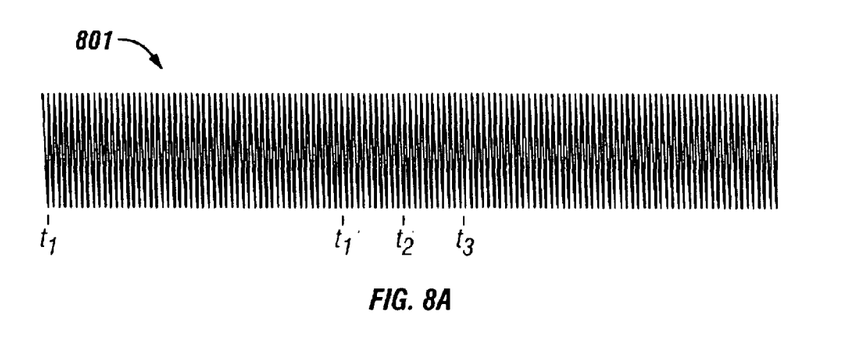
FIGS. 8a–8c (Prior art) show the concept of undersampling.
Figure 8B:
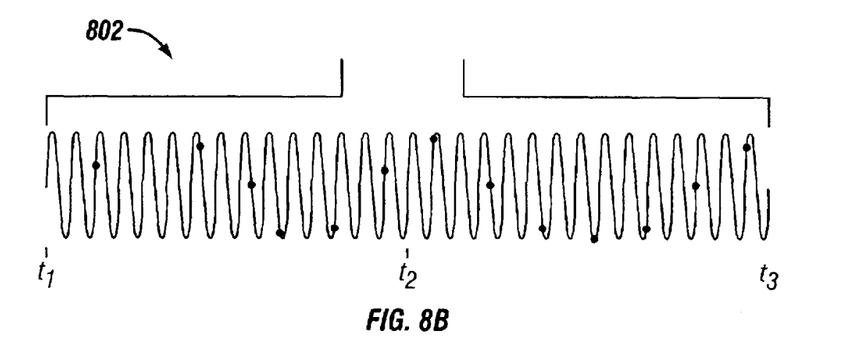
Figure 8C:
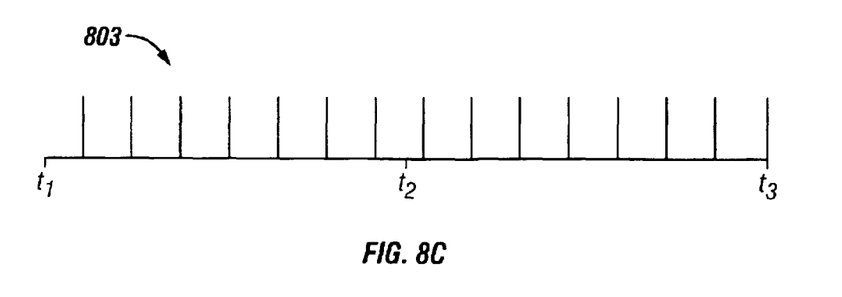

FIG. 8a shows a high frequency EM signal 801 characteristics of which are desired to be determined. FIG. 8b shows an expanded version 802 of a portion of the signal between times $t_1$, and $t_3$ Shown in FIG. 8c is an undersampling signal 803 that is aliased with respect to the frequency of the signal 801. However, it can be seen that the sampling signal progressively changes its phase relative to the phase of the signal 802. The result of using such a sampling signal is that the signal 802 is sampled at times indicated by the dots in FIG. 8b. The end result is that the sampled points give an adequate representation of two quantities of interest in resistivity measuring devices. The quantities of interest are the phase of the high frequency signal and its amplitude, the quantities being measured at two different receiver locations. This is not a violation of the Nyquist sampling theorem since the entire EM signal is not being reconstructed. The method of undersampling takes advantage of the fact the frequency of the signal transmitted by a transmitter is a known and stable quantity and the signal does not vary by a measurable amount during the time it takes to record representative samples. As would be known to those versed in the art, based on the principle of reciprocity, the undersampling could also be used with two transmitters and one receiver.

Upon transmission of the signal from $T_U$' and reception of the propagated signal by $R_U$' and $R_L$', data is measured and recorded. The lower transmitter $T_L$' is then energized and the same measurements are performed but in the opposite direction. Phase attenuation, resistivity and dielectric constant are derived as per normal practice. High spatial resolution is obtained by keeping the inter-receiver spacing to less than two inches (e.g. 0.5 inches) and by collimating the signal azimuthally.

The signals which arrive at the receivers, $R_U$' and $R_L$', are out of phase with each other by a phase angle which depends upon properties of the media through which the energy has passed and have an amplitude ratio which also depends upon properties of such media. The relation between the measurements and physical quantities can be determined, for example, as in Clark '581. Measurements of these signal properties are thus useful in determining those physical properties (i.e. dielectric constant and conductivity of the formation). Such measurements can be obtained as the drill tool rotates to obtain a circumferential image of the physical parameter. Alternatively, obtained measurements can be stacked into a plurality of azimuthal sectors, thereby giving rise to measurements of the physical parameter by sector. The azimuthal measurements can be averaged, for example, by sector.

In an alternate embodiment of the invention, measurements are made with only one transmitter-receiver spacing to obtain an attenuation of the signal. This gives what is known as an uncompensated measurement, and requires knowledge of the transmitter-receiver spacing and of the distance between the face of the sensor and the borehole wall.

The antenna assembly is operable at frequencies preferably within the range of 50 MHz and 300 MHz, though a range of 10 MHz to 2 Ghz would be expected to give satisfactory results. The skin depth found at high frequencies is sufficient to enable the operator to obtain reliable measurements from the surface of the borehole formation, but also makes it more sensitive to borehole rugosity. The present invention can be used in environments of water-based mud and in oil-based muds, which, being of low conductivity, typically produce a capacitive layer.

Hard facing 405 makes contact with the borehole formation 401 and also separates the stabilizer 301' from the borehole formation. The hard facing thereby reduces wear on the stabilizer assembly and simultaneously maintains a substantially constant stand-off between the borehole formation and the sensors. Hard facing can be typically made of a hard substance such as steel, for example. Preferably, the depth of the stand-off is in a preferable range of a few millimeters, e.g. 3 mm. As the hard facing wears away, the stand-off depth can pass through the preferred range. Once hard facing 405 is reduced to a certain thickness, the hard facing can be replaced for a cost substantially less than that need to replace a stabilizer 301'. The apparatus of Thompson '793, having a sensor embedded within a stabilizer, makes contact with the borehole formation, and therefore does not have the stand-off shown in the present invention.

In an embodiment of the present invention, a rotation rate of the drillstring can achieve 100 revolutions per minute (RPM). In the invention of Thompson '793, rotation rates are typically on the order of 1 RPM, typically with a rate of penetration of 60 ft/hr. For proper resolution, an adequate ratio between ROP and RPM is necessary. For example, for a 0.5"×0.5" pixel resolution using a single sensor, ROP (ft/hr)<2.5 RPM is necessary (e.g. for RPM=200, ROP<500 ft/hr is necessary). Alternatively, the minimum RPM>0.4 ROP (ft/hr) for 0.5"×0.5" pixel resolution using a single sensor. At a ROP of 60 ft/hr typical in the art, an implementation on slowly rotating pads, such as in Thompson '793, would therefore require multiple sensors and even then may not provide adequate coverage and resolution. In reality, an implementation of such a configuration can be complicated. Design of the present invention enables the use of a single sensor assembly.

Figure 5A:
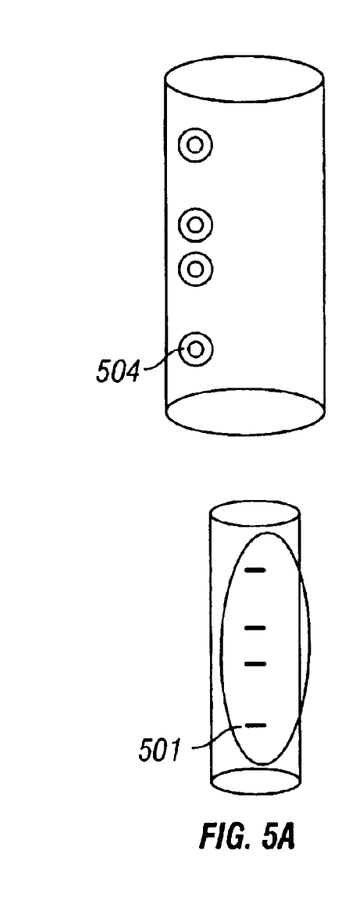
FIGS. 5A, 5B, 5C shows many slot configurations usable with the invention.
Figure 5B:
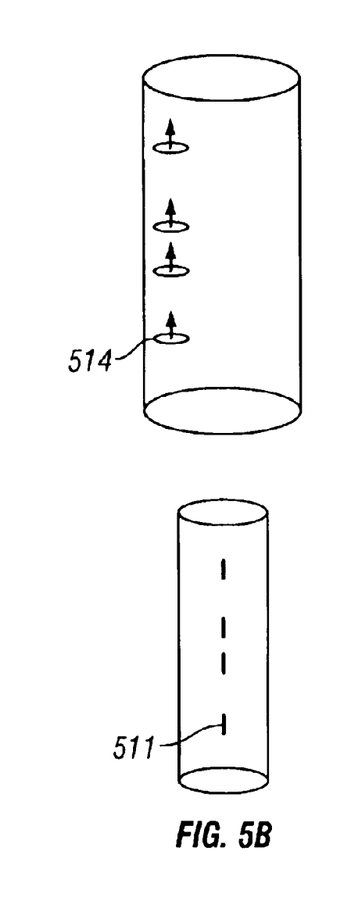
Figure 5C:
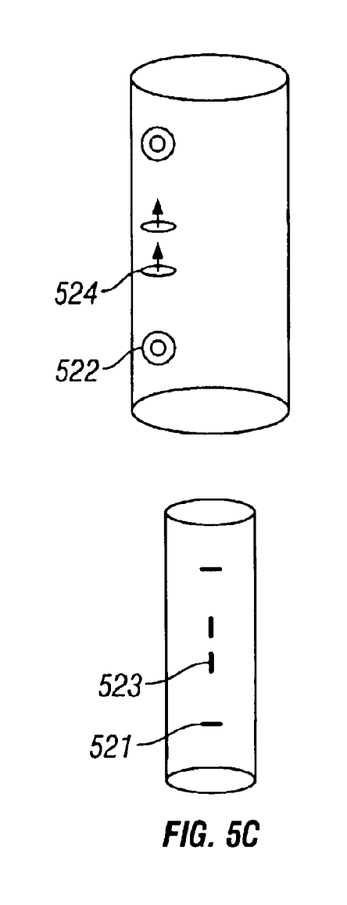

FIGS. 5a–5c show exemplary configurations of antenna coils and slots. In FIG. 5a, the slots are arranged in a broadside configuration, with the direction of propagation parallel to the tool axis. The transmitter and receiver coils are directed outwards from the tool. FIG. 5b shows an arrangement with the slots arranged in an endfire configuration, with the direction of propagation parallel to the tool axis. the transmitter and receiver coils in FIG. 5b are oriented parallel to the tool axis. FIG. 5c shows a mixed configuration of the slots. It is also possible to have configurations (not shown) in which the direction of propagation is transverse to the tool axis.

Thompson '793 employs pad mounted sensors. Stabilizer mounted sensors are used only for induction logging, not imaging. The present invention employs imaging methods on stabilizer.

Figure 6A:
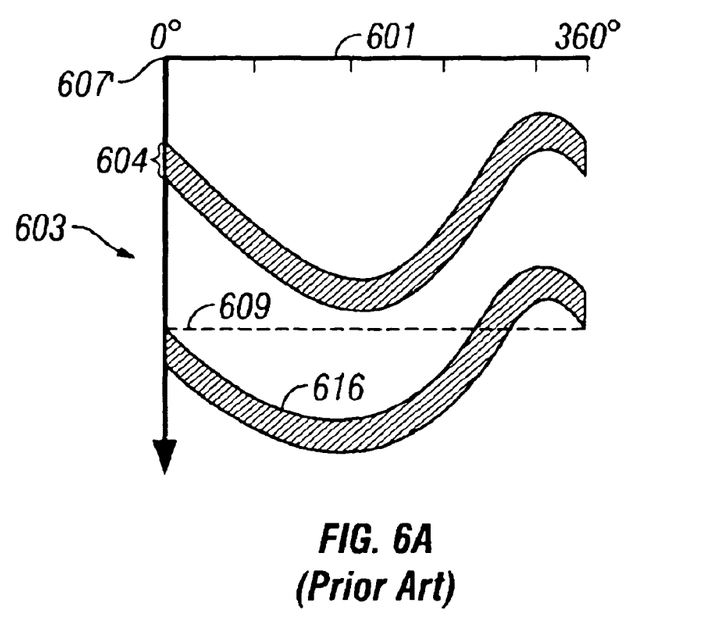
FIGS. 6A, 6B (Prior Art) shows and example of resistivity data from prior art.
Figure 6B:
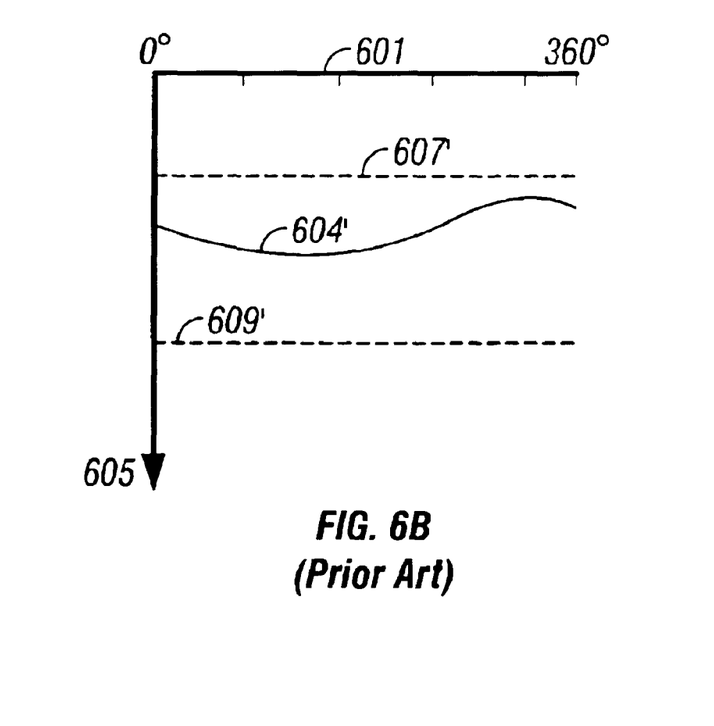

The method of processing of acquired data from an arrangement of formation sensors in Thompson '793 is discussed and may be used in the present invention. FIG. 6A illustrates the "unwrapped" resistivity data that might be recorded by a first resistivity sensor rotating in a vertical borehole as the well is being drilled. The horizontal axis 601 has values from 0° to 360° corresponding to azimuthal angles from a reference direction determine by the directional sensor (271). The vertical axis 603 is the time of measurement. As the resistivity sensor rotates in the borehole while it is moved along with the drill bit, it traces out a spiral path. Indicated in FIG. 6A is a sinusoidal band 604 corresponding to, say, a bed of high resistivity intersecting the borehole at a dipping angle. After reducing data using filtering methods, the data can be displayed on a depth scale as in FIG. 6B where the vertical axis 605 is now depth and the horizontal axis 601 is still the azimuthal angle with respect to a reference direction. The dipping resistive bed position is indicated by the sinusoid 604'. Such a depth image can be obtained from a time image if at times such as 607 and 609, the absolute depth of the resistivity sensor, 607' and 609' were known.

Depth information may be communicated downhole from a surface location. Alternatively, the method disclosed in U.S. patent application Ser. No. 10/167,332 of Dubinsky et al. having the same assignee as the present application and the contents of which are incorporated herein by reference. The method of Dubinsky uses axial accelerometers to determine a rate of penetration. Alternatively, measurements made using a second resistivity sensor at a different axial position may be used. This is illustrated in FIG. 6A by a second resistivity band 616 corresponding to the same dipping band 604 as measured at a second resistivity sensor above the first resistivity sensor on a second stabilizer or at different axial positions on the same stabilizer. The spacing between the first and second resistivity sensors being known, a rate of penetration is computed by the microprocessor by measuring the time shift between the bands 604 and 616. The time shift between the bands 604 and 606 could be determined by one of many methods.

One novel feature of the present invention recognizes the fact that downhole depth measurements on a MWD tool are susceptible to error over short intervals. Accordingly, the downhole processor determines an apparent dip of boundaries on a resistivity image assuming a preset rate of penetration or measuring downhole the rate of penetration using z-axis accelerometer, and this apparent dip is sent by telemetry to the surface, along with times and depths at which the image was processed to give the dip estimate. Instead of dept. The actual times of data acquisition and assumed or measured ROP used in the dip determination could also be telemetered. A surface processor would have more accurate depth measurements and rates of penetration corresponding to the times at which the measurements are made, and can therefore correct the apparent dip determination.

Figure 7:
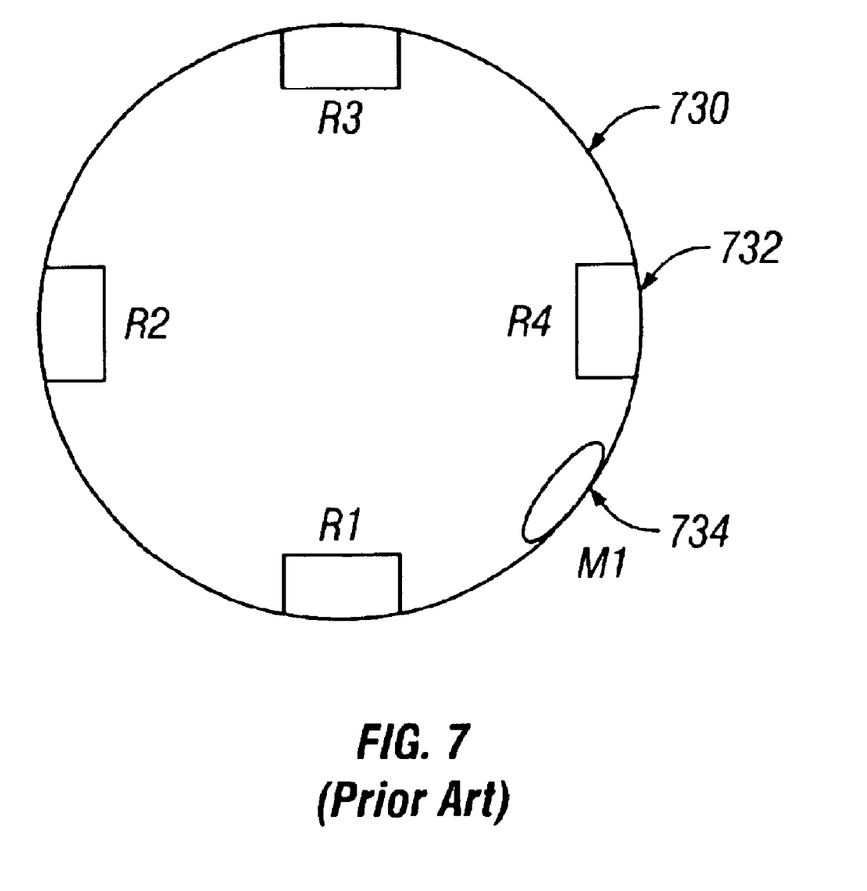
FIG. 7 (Prior Art) shows an arrangement of sensors in cross-sectional view

In a preferred embodiment of the present invention, as seen in the tool cross-section 730, the sensor arrangement includes a magnetometer 734 as shown in FIG. 7. Magnetometer M1 makes measurements of the direction of the earth's magnetic field. Except for the rare case wherein the borehole is being drilled along the direction of the earth's magnetic field, the magnetometer output in conjunction with borehole survey information can be used to determine the relative orientation of the sensor R1 to magnetic north.

FIGS. 5A, 5B, and 5C show several coil arrangements for a compensated MWD oil-base imager. As shown in the FIG. 5A, the rectangular slots 501 are aligned so that the long edge extends in a direction transverse to the longitudinal axis of the borehole. Coils 504 are accordingly arranged so as to give rise to a magnetic field with a magnetic dipole oriented transverse to the axis of the drill tool. This configuration has become known as a "broadside" array.

The configuration shown in FIG. 5B employs vertical slots 511 extending in a direction perpendicular to the longitudinal direction of the borehole. The antenna coils 514 are aligned so that the magnetic field that arises from the antenna coils give rise to a magnetic dipole that is oriented along the longitudinal axis of the drill tool. This configuration is known as an "endfire" array. For a fixed frequency, the endfire array exhibits a substantially deeper depth of investigation over the "broadside" array and is less affected by tool stand-off (e.g. from mudcake). On the other hand, the broadside array exhibits a stronger signal characteristic than the endfire array and may be preferred in relatively lossy (low resistivity) logging environments such as when using water-based muds.

In FIG. 5C, transmitter coils 522 and receiver coils 524 are oriented orthogonal to each other. The transmitter coils are oriented to give rise to a magnetic dipole oriented along the transverse direction to the drill tool. The transmitted signal passes through horizontal slots 521 that correspond to the orientation of the transmitting coils. The direction of the receiver coils 524 lie parallel to the longitudinal axis of the drill tool, so as to give rise to a magnetic dipole oriented along the longitudinal direction of the drill tool. The slots 523 corresponding to the receiving antennae 524 are vertically oriented. The orthogonal antennas remove direct coupling. An advantage of the configuration of FIG. 5C comes from this removal of direct coupling. All received signals can be attributed as having been obtained from the formation.

While the foregoing disclosure is directed to the preferred embodiments of the invention, various modifications will be apparent to those skilled in the art. It is intended that all such variations within the scope and spirit of the appended claims be embraced by the foregoing disclosure.

What is claimed is:

1. A measurement-while-drilling (MWD) apparatus conveyed within a borehole for determining electrical properties of a formation surrounding said borehole, said MWD device comprising:
    (a) a rotatable drill collar;
    (b) at least one stabilizer coupled to said collar and rotating at the same speed as said drill collar;
    (c) a hardfacing on outer face of said at least one stabilizer to maintain a desired standoff from the borehole wall;
    (d) at least one transmitter on the at least one stabilizer for conveying of at least one RF signal into said formation; and
    (e) at least one receiver on the at least one stabilizer, said at least one transmitter and said at least one receiver, for obtaining a resistivity image of the earth formation from a signal received at the at least one receiver resulting from interaction of the at least one RF signal with said formation.

2. The method of claim 1 wherein the at least one transmitter and the at least one receiver comprise a plurality of transmitter-receiver distances.

3. The apparatus of claim 1, wherein said at least one stabilizer is extendable.

4. The apparatus of claim 1, wherein said at least one transmitter further comprises two spaced-apart collimated transmitting antennae.

5. The apparatus of claim 4, wherein said at least one receiver further comprises two spaced-apart collimated receiving antennae evenly positioned between said at least two transmitting antennae.

6. The apparatus of claim 1, wherein said at least one transmitter and said at least one receiver are operated substantially within a frequency range of 10 MHz to 2 GHz.

7. The apparatus of claim 1 further comprising an analog to digital (A/D) converter for undersampling of said at least one received signal.

8. The apparatus of claim 1, further comprising at least one of: i) an axial accelerometer, or ii) a second resistivity sensor at a different axial position, for determining a rate of penetration of said drill collar.

9. The apparatus of claim 1, further comprising at least one transmitter and at least one receiver on an additional stabilizer.

10. The apparatus of claim 1, wherein said at least one receiver and said at least one transmitter are disposed within at least one cavity along the outer face of said at least one stabilizer, said at least one cavity having a rectangular slot.

11. The apparatus of claim 10, wherein a long side of said rectangular slot is parallel to the direction of a magnetic dipole moment of one of: i) the transmitter, and, ii) the receiver disposed within said cavity.

12. The apparatus of claim 11, wherein a magnetic dipole moment of the at least one transmitter and the at least one receiver are aligned parallel to a longitudinal axis of the drill collar.

13. The apparatus of claim 11, wherein a magnetic dipole moment of the at least one transmitter and the at least one receiver are aligned perpendicular to a longitudinal axis of the drill collar.

14. The apparatus of claim 11, wherein a magnetic dipole moment of the at least one transmitter is aligned substantially orthogonal to a dipole moment of the at least one receiver.

15. A method of determining electrical properties of a formation surrounding a borehole, comprising:
    (a) conveying a logging tool having a rotatable drill collar into a borehole;
    (b) using at least one transmitter positioned on at least one stabilizer coupled to said rotatable drill collar to inject at least one RF signal into said formation;
    (c) using at least one receiver positioned on said at least one stabilizer for making a measurement of at least one of (I) a phase, and, (II) an attenuation, of said RF signal upon propagation through said formation; and
    (d) using a hardfacing on outer face of said extendable stabilizer to maintain a desired standoff from the borehole wall.

16. The method of claim 15 wherein said at least one transmitter and said at least one receiver define a plurality of transmitter-receiver spacings.

17. The method of claim 15, wherein said at least one stabilizer is extendable.

18. The method of claim 15, wherein using said at least one transmitter further comprises using two spaced-apart collimated transmitting antennae.

19. The method of claim 15, wherein said at least one receiver further comprises two spaced-apart collimated receiving antennae evenly positioned between said at least two transmitting antennae.

20. The method of claim 15, wherein using said at least one transmitter and said at least one receiver further comprises operating said at least one transmitter and said at least one receiver substantially within a frequency range of 10 MHz to 2 GHz.

21. The apparatus of claim 15, further comprising determining a rate of penetration of said drill collar using one of: i) an axial accelerometer, or ii) a second resistivity sensor at a different axial position.

22. The method of claim 15, further comprising at least one transmitter and at least one receiver on an additional stabilizer.

23. The method of claim 15, wherein said at least one receiver and said at least one transmitter are disposed within at least one cavity along the outer face of said at least one stabilizer, said at least one cavity having a rectangular slot.

24. The method of claim 23, wherein a long side of said rectangular slot is parallel to the direction of a magnetic dipole moment of one of: i) the transmitter, and, ii) the receiver disposed within said cavity.

25. The method of claim 23, wherein a magnetic dipole moment of the at least one transmitter and the at least one receiver are aligned parallel to a longitudinal axis of the drill collar.

26. The method of claim 23, wherein a magnetic dipole moment of the at least one transmitter and the at least one receiver are aligned substantially parallel to each other.

27. The method of claim 23, wherein a magnetic dipole moment of the at least one transmitter is aligned substantially orthogonal to a dipole moment of the at least one receiver.

28. The method of claim 15 further comprising undersampling said propagated RF signal.

29. The method of claim 15 further comprising determining from said at least one measurement at least one of (i) a resistivity of said formation, (ii) a resistivity of a connate formation fluid, (iii) a dielectric constant of a dry rock matrix, and, (iv) a water filled porosity of the formation.

30. The method of claim 15 further comprising repeating step (c) at a plurality of angular positions of said logging tool and at a plurality of depths of said logging tool in the borehole, providing a plurality of measurements.

31. The method of claim 30 further comprising determining from said plurality of measurements a resistivity image of a wall of said borehole.

32. The method of claim 30 further comprising using a downhole processor for determining from said plurality of measurements an apparent dip of a bed boundary.

33. The method of claim 32 further comprising determining said plurality of depths at least in part from downhole measurements.

34. The method of claim 33 further comprising telemetering said apparent dip and said downhole depth measurements to an uphole location.

35. The method of claim 34 further comprising:
  (i) comparing said telemetered downhole depth measurements with depth measurements made at a surface location, and
  (ii) using a processor for correcting said apparent dip based on said comparison.

36. The method of claim 30 further comprising using a downhole orientation sensor for measuring said angular positions.

37. The method of claim 30 further comprising determining said plurality of depths at least in part from downhole accelerometer measurements.

* * * * *